UNITED STATES PATENT OFFICE.

WILLIAM A. BALDWIN, OF CHICAGO, ILLINOIS, ASSIGNOR OF ONE-FOURTH TO J. CLEMENT SMITH, JAMES J. SHEEHY, AND AMMI A. THOMAS, ALL OF WASHINGTON, DISTRICT OF COLUMBIA.

BATH FOR EXTRACTING ALUMINUM AND ALLOYING IT WITH OTHER METALS.

SPECIFICATION forming part of Letters Patent No. 380,161, dated March 27, 1888.

Application filed January 31, 1888. Serial No. 262,540. (No specimens.)

*To all whom it may concern:*

Be it known that I, WILLIAM A. BALDWIN, a citizen of the United States, residing at Chicago, in the county of Cook and State of Illinois, have invented certain new and useful Improvements in Means for Extracting Aluminum and Alloying it with other Metals; and I do declare the following to be a full, clear, and exact description of the invention, such as will enable others skilled in the art to which it appertains to make and use the same.

This invention relates to means for extracting aluminum from clay or other earths bearing alumina, and also combining it with other metals; and it consists in the composition of matter hereinafter described, which is adapted by fusion to serve as a bath for the purposes specified.

In preparing my composition of matter I take of dry and finely-ground sodium chloride three parts; of dry and finely-ground clay or other earth bearing alumina, one part, and of dry and ground charcoal, one-fourth part, by weight. These substances I mix thoroughly together, and then the compound is ready for use. I use the composition in the manner following, to wit: I place such quantity thereof as may be desired in a suitable pot or melting-furnace and fuse it as thoroughly as possible. I then introduce into the fused mass, which I call a "bath," any metal which has an affinity for aluminum, such as iron, copper, zinc, or tin. This is done either after melting such metal or without changing its form, the result being that the metal aluminum is freed from its matrix and alloyed with the metal so introduced.

It is obvious that coal, coke, or other carbonaceous substance may be used in the place and stead of charcoal; but my experiments show that charcoal is preferable to any other material for the purpose mentioned.

I claim as my invention—

The composition of matter herein described, consisting of sodium chloride, clay, or other earth bearing alumina, and charcoal, the sodium chloride being in excess of the other ingredients, and the whole adapted to be fused, and thereby serve as a bath for the purpose specified.

In testimony whereof I affix my signature in presence of two witnesses.

WILLIAM A. BALDWIN.

Witnesses:
I. S. BAKER,
W. W. WEAVER.